United States Patent
Li et al.

(10) Patent No.: US 12,503,055 B2
(45) Date of Patent: Dec. 23, 2025

(54) FRONT CONSOLE STORAGE BIN

(71) Applicants: NISSAN NORTH AMERICA, INC., Franklin, TN (US); GSC Co. Ltd., Hwaseoung-si (KR)

(72) Inventors: Xin Li, Farmington Hills, MI (US); Jinhyoung Park, Gyeonggi-do (KR)

(73) Assignees: NISSAN NORTH AMERICA, INC., Franklin, TN (US); GSC Co., Ltd., Gyeonggi-Do (KR)

( * ) Notice: Subject to any disclaimer, the term of this patent is extended or adjusted under 35 U.S.C. 154(b) by 455 days.

(21) Appl. No.: 18/145,722

(22) Filed: Dec. 22, 2022

(65) Prior Publication Data
US 2024/0208423 A1    Jun. 27, 2024

(51) Int. Cl.
*B60R 7/04* (2006.01)

(52) U.S. Cl.
CPC ..................................... *B60R 7/04* (2013.01)

(58) Field of Classification Search
CPC ..... B60R 7/04; B60R 7/06; B60R 2011/0007; B60R 2011/0084
USPC .......... 296/37.1, 37.8, 37.14, 24.34
See application file for complete search history.

(56) References Cited

U.S. PATENT DOCUMENTS

| | | | | |
|---|---|---|---|---|
| 4,341,304 A * | 7/1982 | Diller | ....................... | B25H 5/00 206/349 |
| 6,206,260 B1 * | 3/2001 | Covell | ....................... | B60R 7/082 224/567 |
| 7,011,273 B1 * | 3/2006 | Stanford | ................ | B60N 3/102 244/1 R |
| 7,513,553 B2 * | 4/2009 | Singh | ....................... | B60N 3/08 296/37.8 |
| 7,530,615 B2 * | 5/2009 | Ogura | ....................... | B60R 7/04 296/37.8 |
| 7,614,674 B2 * | 11/2009 | Shiono | .................... | E05B 83/32 296/37.8 |
| 8,939,491 B2 * | 1/2015 | Gillis | ........................ | B60R 7/04 296/37.12 |
| 2006/0022478 A1 * | 2/2006 | DeLong | .................... | B60R 7/04 296/37.8 |
| 2007/0069541 A1 * | 3/2007 | Sturt | ......................... | B60R 7/04 296/24.34 |
| 2019/0366934 A1 * | 12/2019 | Kishimoto | ............... | B60R 7/04 |
| 2020/0369189 A1 * | 11/2020 | Vite Cadena | ............. | B60R 7/04 |

FOREIGN PATENT DOCUMENTS

| | | | | |
|---|---|---|---|---|
| FR | 2941664 A1 * | 8/2010 | ............... | B60R 7/04 |
| FR | 3012775 A1 * | 5/2015 | ............... | B60R 7/04 |
| JP | 58180339 A * | 10/1983 | ............... | B60R 7/04 |

OTHER PUBLICATIONS

Translation of JP 58180339 (Year: 1983).*
Translation of FR 2941664 (Year: 2010).*

* cited by examiner

Primary Examiner — Amy R Weisberg
Assistant Examiner — Veronica M Condo
(74) Attorney, Agent, or Firm — Global IP Counselors, LLP

(57) ABSTRACT

A center console accessory includes a tray body having a floor, a pair of side wall structures, a forward wall structure and a rearward wall structure that together define a concaved storage area. The forward wall structure includes a lower surface portion shaped and dimensioned to connect to a vehicle floor structure of a vehicle. The rearward wall structure is dimensioned and shaped to attach to a front area of a center console of the vehicle.

20 Claims, 8 Drawing Sheets

FRONT CONSOLE STORAGE BIN

BACKGROUND

Technical Field

The present disclosure generally relates to a center console assembly. More specifically, the present disclosure relates to center console assembly that includes a center console with a tray accessory located forward of the center console and removably fixed to the center console.

Background Information

Passenger compartments of vehicles typically include a center console. In many vehicles, and empty space on the floor is defined between the center console and the instrument panel of the vehicle.

SUMMARY

One object of the present disclosure is to provide a passenger compartment of a vehicle with a tray accessory that is easily installed along a portion of the floor of the passenger compartment between a center console and the instrument panel of the vehicle.

In view of the state of the known technology, one aspect of the present disclosure is to provide a center console accessory with a tray body having a floor, a pair of side wall structures, a forward wall structure and a rearward wall structure that together define a concaved storage area. The forward wall structure includes a lower surface portion shaped and dimensioned to connect to a vehicle floor structure of a vehicle. The rearward wall structure is dimensioned and shaped to attach to a front area of a center console of the vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
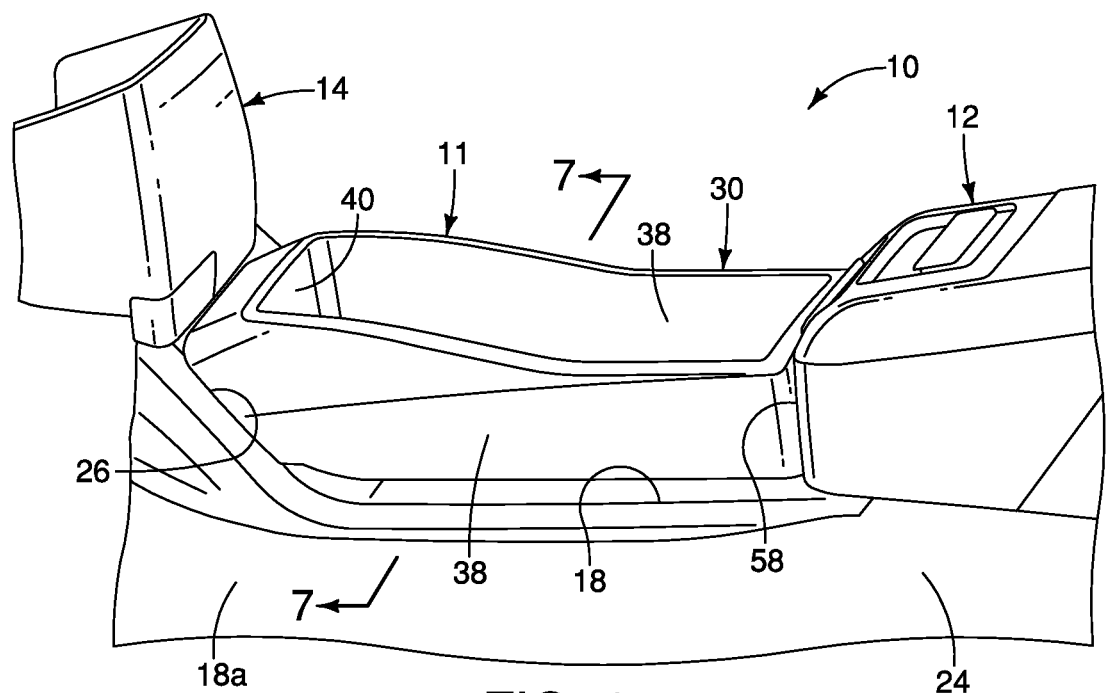
FIG. 1 is a side perspective view of a center console assembly that includes a center console and a center console accessory in accordance with an exemplary embodiment.
Figure 2:
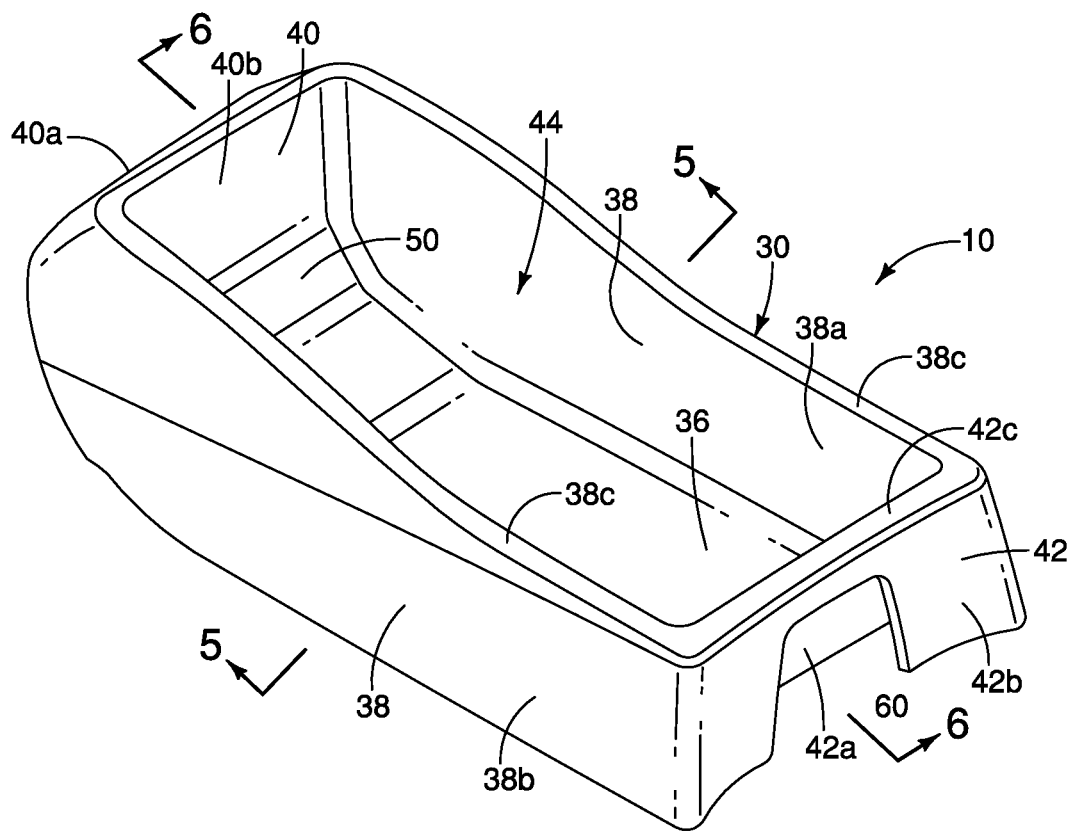
FIG. 2 is a perspective view of a tray body of the center console accessory in accordance with the exemplary embodiment.

Referring initially to FIG. 1, a center console assembly 10 includes a center console accessory 11 and a center console 12 is illustrated in accordance with an exemplary embodiment. The center console accessory 11 (also referred to as a front console storage bin 11) is dimensioned and configured to install to a center console 12 and extend forward therefrom to a structure 14 that extends downward from an instrument panel (not shown) or dashboard (not shown) toward a floor 18 of a vehicle 20, as is described in greater detail below.

Figure 3:
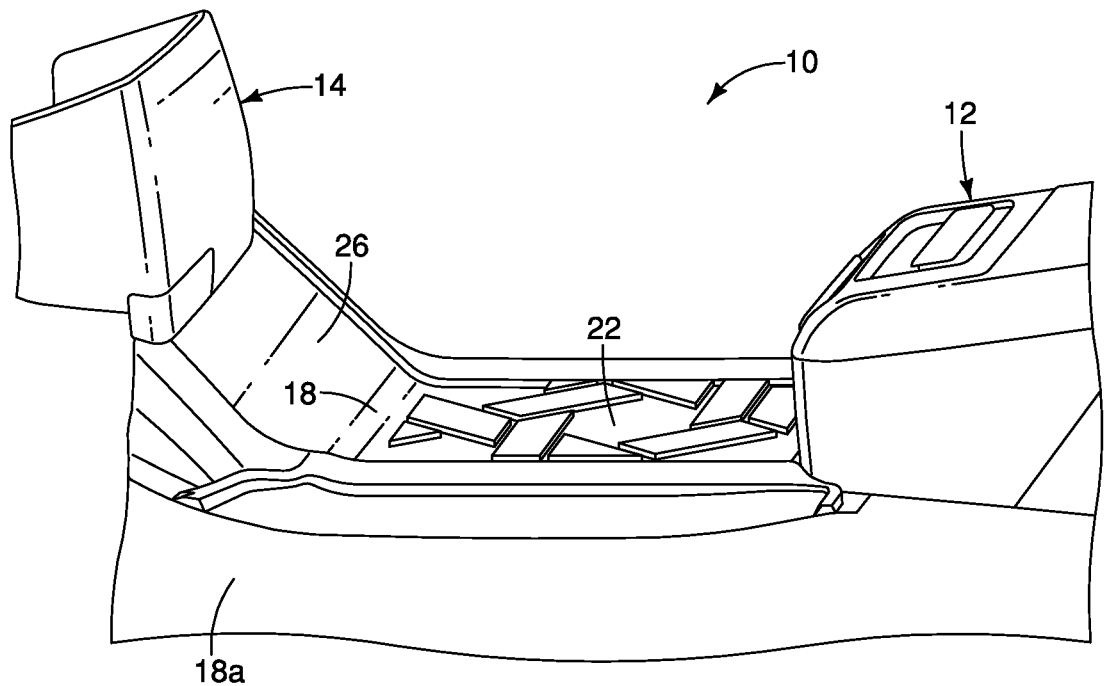
FIG. 3 is another side perspective view of a passenger compartment floor, and the center console with carpeting and the center console accessory removed in accordance with the exemplary embodiment.
Figure 4:
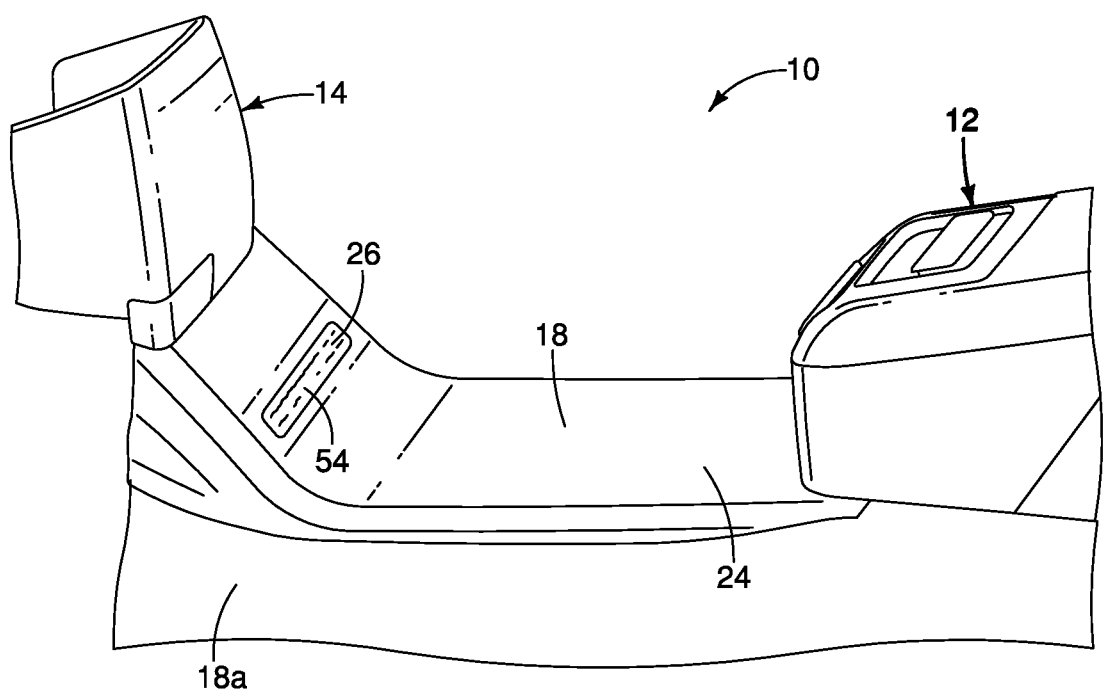
FIG. 4 is yet another side perspective view of the passenger compartment floor and the center console with carpeting covering the floor with the center console accessory removed in accordance with the exemplary embodiment.

Only a portion of the floor 18 of a passenger compartment of the vehicle 20 is shown in FIGS. 1, 3-4 and 7 for the sake of brevity. As shown in FIG. 3, the floor 18 of the passenger compartment of the vehicle 20 preferably includes a contoured surface portion 22 that can be formed on a metallic floor panel (part of a vehicle body structure of the vehicle 20) or can be a layer of material that overlays the part of the vehicle body structure that defines the floor 18. The contoured surface portion 22 is centrally located within the passenger compartment of the vehicle 10 and extends from the front of the center console 12 to the structure 14.

The contoured surface portion 22 between the center console 12 and the structure 14 is generally planar but includes surface contours, as shown in FIG. 3. The contoured surface portion 22 can be covered by a cushioning and/or noise dampening material (optional) and is further covered by carpeting 24. The carpeting 24 preferably covers the portions of the floor 18 that extends in front of front seats (not shown) of the vehicle 20. The front seats (not shown) are preferably located on opposite sides of the center console 12.

The contoured surface portion 22 is a raised area that is higher than the surrounding areas 18a of the floor 18. For example, the contoured surface portion 22 can be one or two inches above adjacent areas 18a of the floor 18. The contoured surface portion 22 includes an inclined area 26 that extends upward and forward toward the structure 14. The carpeting 24 extends over the inclined area 26 as well.

A description of the center console accessory 11 is now provided with specific reference to FIGS. 1-2 and 5-16.

The center console accessory 11 includes a tray body 30 (FIGS. 2 and 5-7) and an attachment structure 32 (FIGS. 8-14). The tray body 30 has a floor 36, a pair of side wall structures 38, a forward wall structure 40 and a rearward wall structure 42 that together define a concaved storage area 44.

The floor 36 defines a bottom wall of a storage area 50 that is surrounded by the pair of side wall structures 38, the forward wall structure 40 and the rearward wall structure 42. The floor 36 (also referred to as the bottom wall 36) extends to and is formed with each of the pair of side wall structures 38, the forward wall structure 40 and the rearward wall structure 42. Specifically, the floor 36, the pair of side wall structures 38, the forward wall structure 40 and the rearward wall structure 42 of the tray body 30 can be manufactured as a single, unitary, homogenous element via, for example, any of a variety of molding processes.

Figure 5:
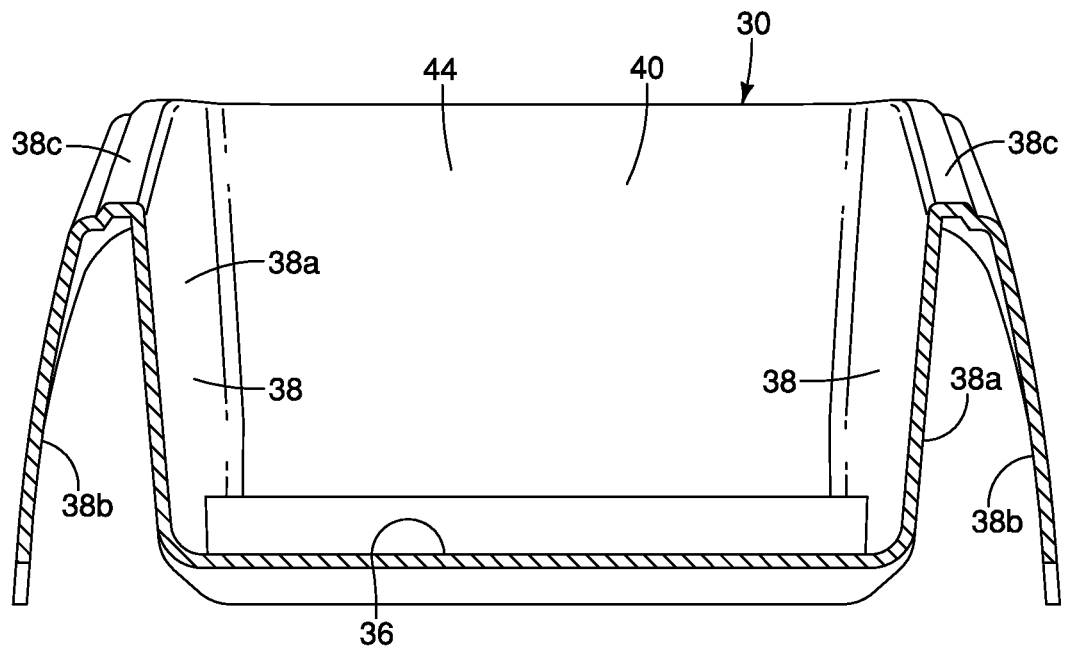
FIG. 5 is a cross-sectional view of the tray body removed from the floor taken along the line 5-5 in FIG. 2 showing side walls and bottom of the tray body that partially define a concave storage area in accordance with the exemplary embodiment.

As shown in FIG. 5, each of the pair of side wall structures 38 includes an inboard wall portion 38a, an outboard wall portion 38b and an upper wall portion 38c that extends between upper ends of the inboard and outboard wall portions with a gap being defined between the inboard and outboard wall portions 38a and 38b.

The forward wall structure 40 includes a lower surface portion 50 that is inclined with respect to the bottom wall 40 of the floor 36 of the center console accessory 11 and inclined relative to horizontal. The angle of inclination of the lower surface portion 50 corresponds to the angle of inclination of the inclined area 26 of the floor 18 of the vehicle 20.

Figure 6:
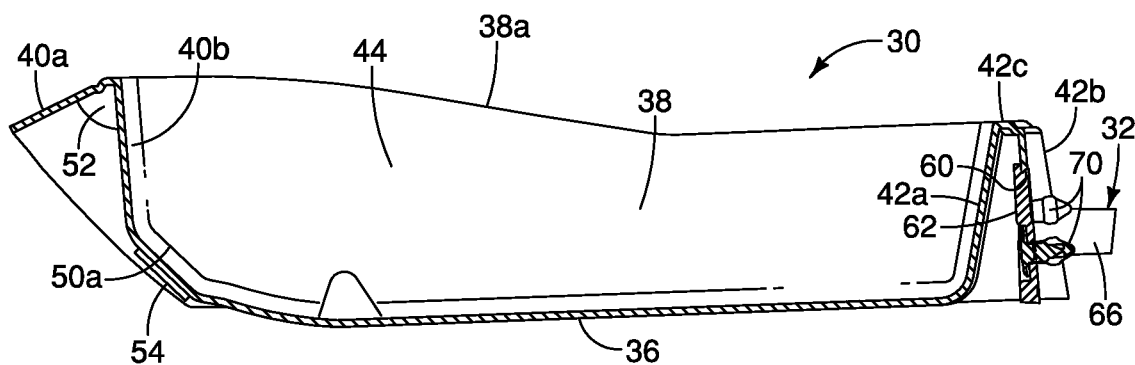
FIG. 6 is a cross-sectional view of the tray body removed from the floor taken along the line 6-6 in FIG. 2 showing a forward wall structure, a rearward wall structure and bottom wall of the tray body that partially define the concave storage area, and further showing an attachment structure of the center console accessory in accordance with the exemplary embodiment.
Figure 7:
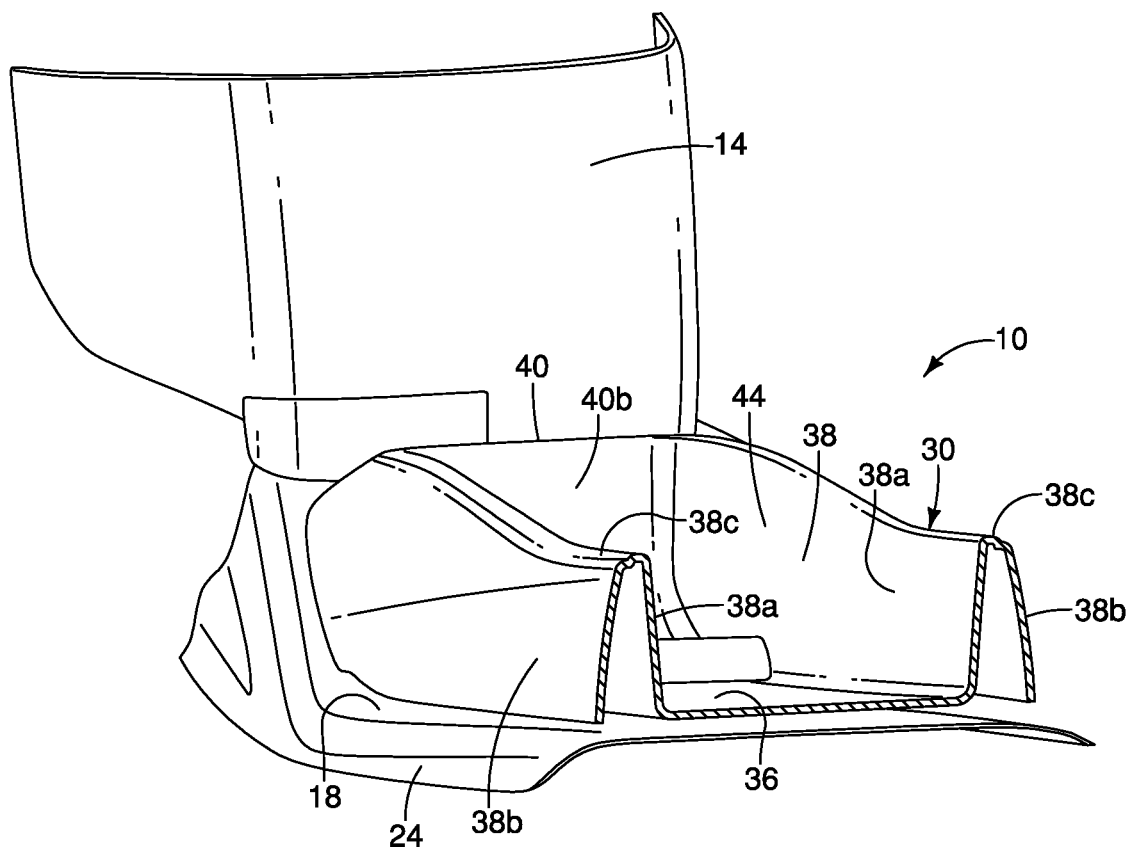
FIG. 7 is a cross-sectional perspective view of the tray body showing the side walls and bottom wall of the tray body overlaying the carpeting and floor of the passenger compartment in accordance with the exemplary embodiment.
Figure 8:
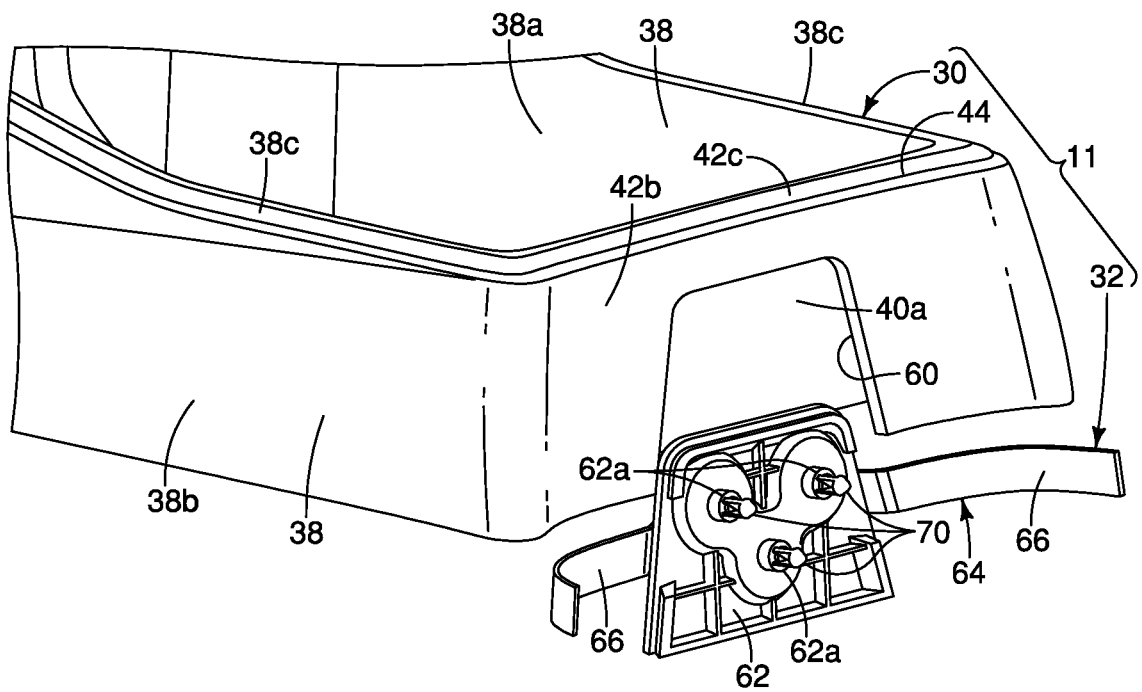
FIG. 8 is an exploded perspective view of the tray body and the attachment structure in accordance with the exemplary embodiment.
Figure 9:
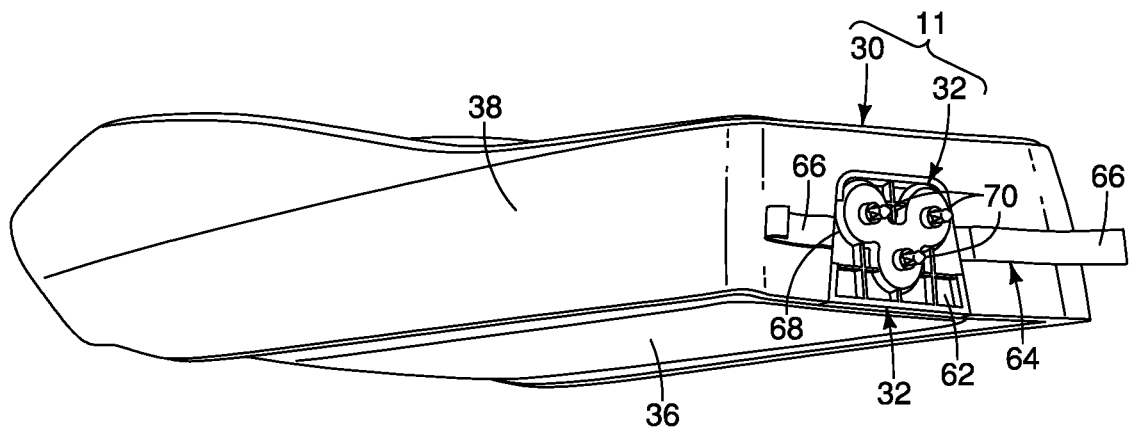
FIG. 9 is a perspective view of the tray body with the attachment structure connected to the tray body in accordance with the exemplary embodiment.
Figure 10:
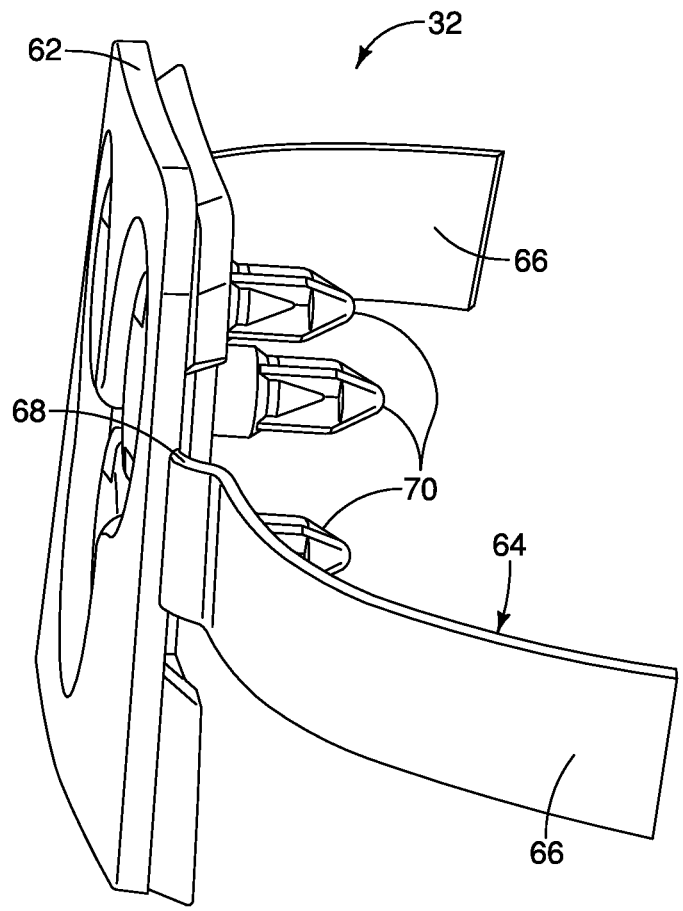
FIG. 10 is a perspective view of the attachment structure removed from the tray body and the center console in accordance with the exemplary embodiment.
Figure 11:
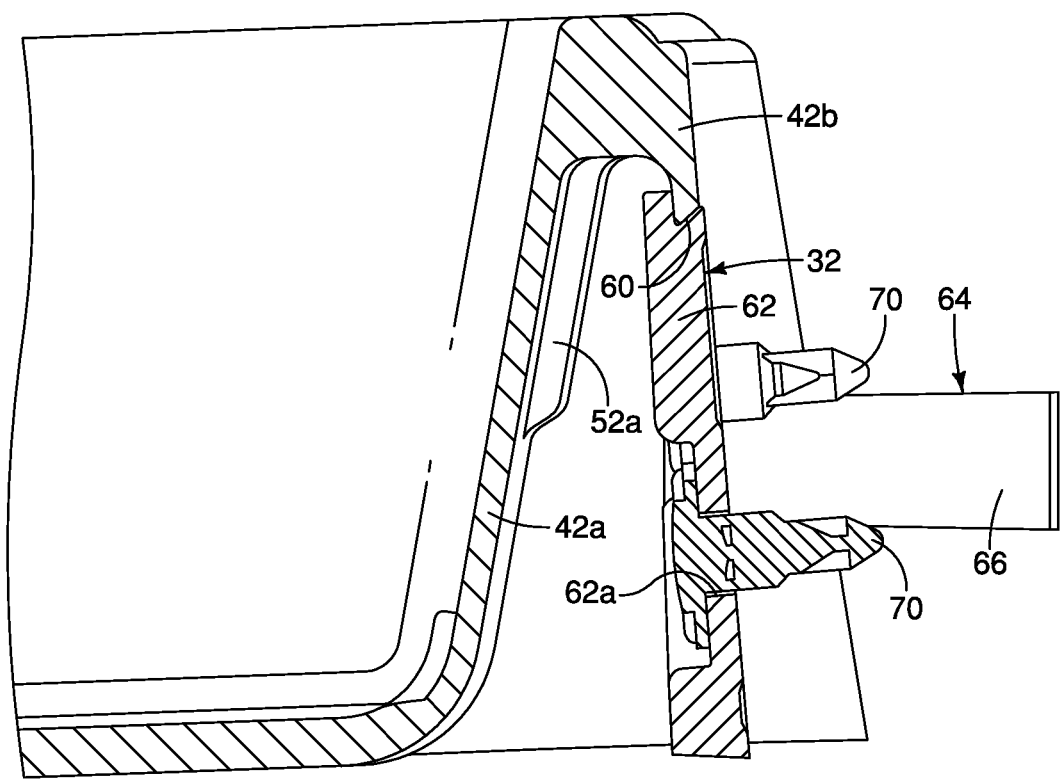
FIG. 11 is a cross-sectional view of a rearward portion of the tray body with a first part of the attachment structure inserted into a recessed area of a rearward wall structure of the tray body in accordance with the exemplary embodiment.
Figure 12:
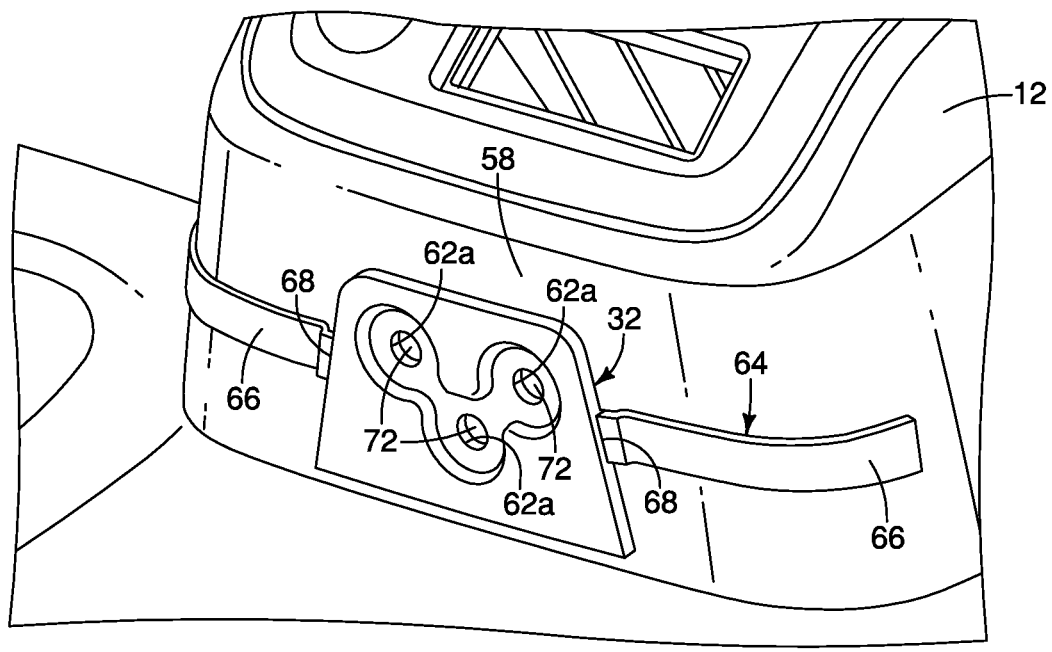
FIG. 12 is a perspective view of the center console with the attachment structure overlaying a front area of the center console during installation of the attachment structure to the center console in accordance with the exemplary embodiment.
Figure 13:
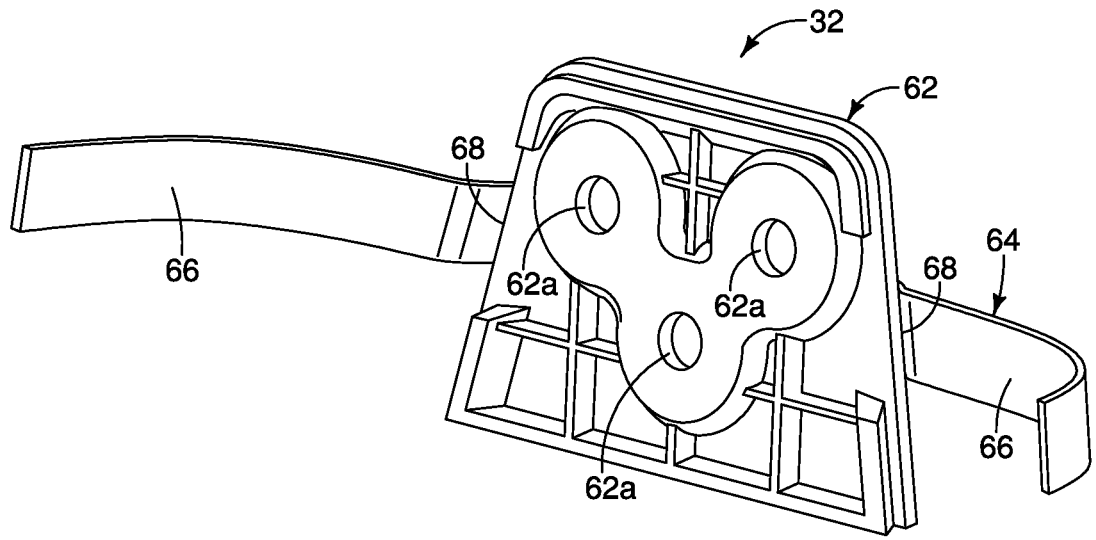
FIG. 13 is a perspective view of the attachment structure in accordance with the exemplary embodiment.
Figure 14:
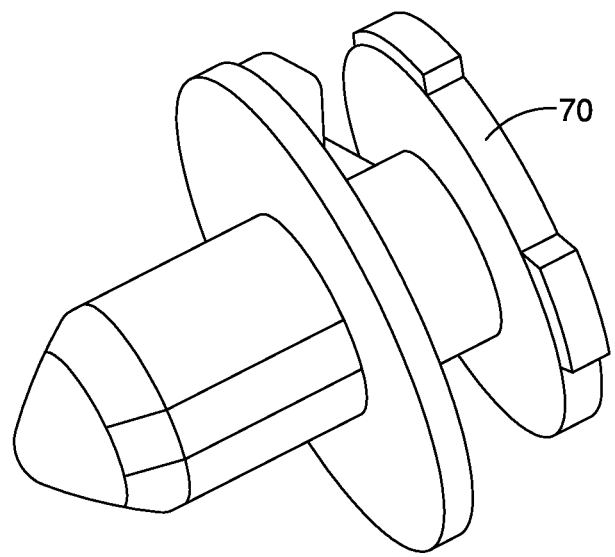
FIG. 14 is a perspective view of a snap-fitting projection used to install the attachment structure to the center console in accordance with the exemplary embodiment.
Figure 15:
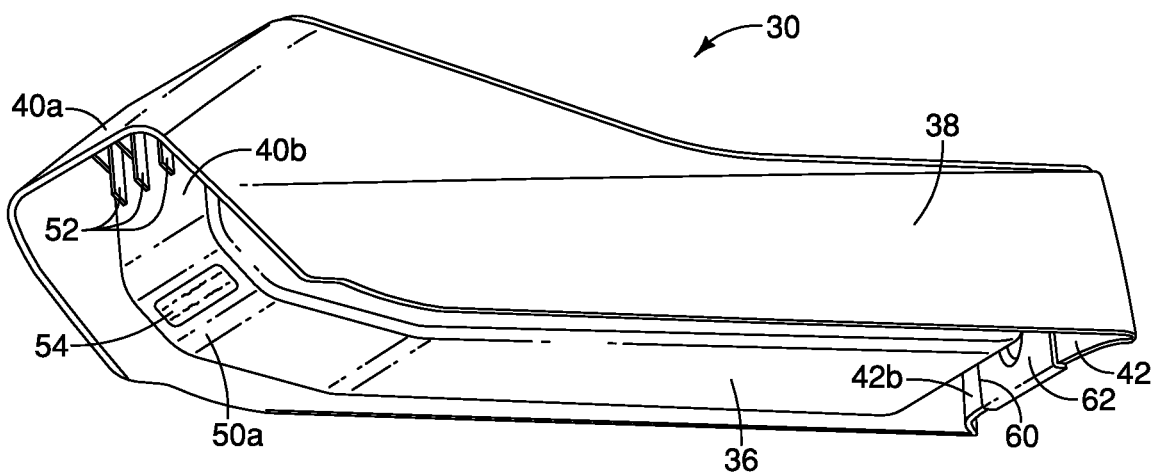
FIG. 15 is a perspective view of the tray body showing the bottom wall, the side wall structures and the forward wall structure thereof in accordance with the exemplary embodiment.

As shown in FIGS. 6 and 15, an underside surface 50a of the lower surface portion 50 is inclined, shaped and dimensioned to overlay the inclined area 26 of the contoured surface portion 22. The underside surface 50a is provided with one of a hook material and loop material 54. The hook material and loop material 54 is a fastening system where the hook material includes multiple tiny hook elements. The loop material includes multiple tiny loop elements. When the hook material contacts the loop material (or vis versa) they fasten to one another. The "other" of the hook material and loop material 54 is either fixed to the carpeting 24 overlaying the inclined area 26 of the floor 18 of the vehicle, or the "other" of the hook material and loop material 54 can be fixed to the carpeting 24. Since the carpet 24 is fixed to the floor 18 of the vehicle, the one of the hook material and loop material 54 can contact the carpeting 24 or the "other" of the hook material and loop material 54 thereby attach the tray body 30 to the inclined area 26 of the floor 18.

Figure 16:
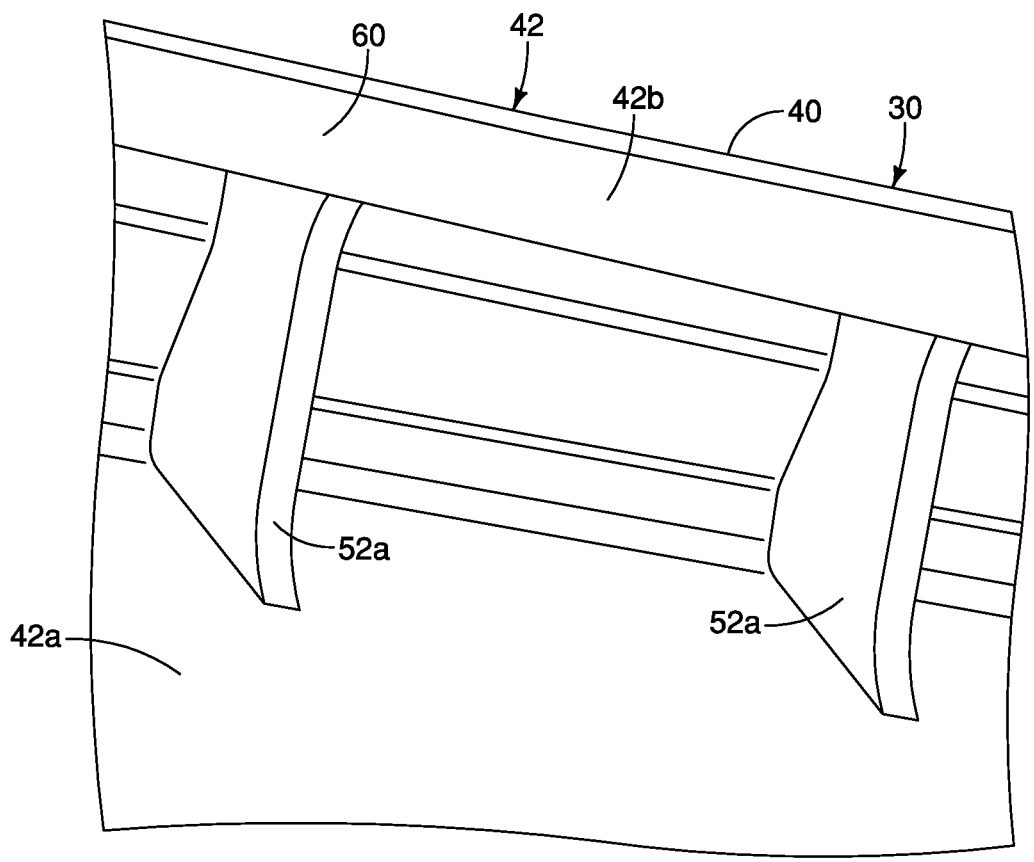
FIG. 16 is a view of the underside of the rearward wall structure showing ribs that extend between inner and outer wall portions of the rearward wall structure in accordance with the exemplary embodiment.

The forward wall structure 40 includes a forward inclined portion 40a and an inner wall portion 40b that extends upward from the inclined lower surface portion 50. An acute angle between 30 and 50 degrees is defined between the forward inclined portion 40a and the inner wall portion 40b. As shown in FIGS. 15 and 16, ribs 52 extend between the forward inclined portion 40a and the inner wall portion 40b to provide strength and rigidity between the forward inclined portion 40a and the inner wall portion 40b.

The rearward wall structure 42 and the attachment structure 32 are dimensioned and shaped to attach the tray body 30 to a front area 58 of the center console 12 of the vehicle 20.

As shown in FIGS. 2, 6, 8-9 and 11, the rearward wall structure 42 includes an inner wall portion 42a, an outer wall portion 42b and an upper wall portion 42c that extends between upper ends of each of the inner wall portion 42a and the outer wall portion 42b. Consequently, the inner wall portion 42a and the outer wall portion 42b are spaced apart from one another with a gap being defined therebetween. The outer wall portion 42b faces rearward relative to the vehicle 20 and further faces the front area 58 of the center console 12 when installed. The outer wall portion 42b includes a cutout or recessed area 60. The recessed area 60 is defined by an edge portion of the rearward wall structure 42. The edge portion has an inverted U-shape. More specifically, the edge portion defines an overall trapezoidal shape. As shown in FIG. 16, ribs 52a extend between upper areas of each of the inner wall portion 42a and outer wall portion 42b for strength and rigidity.

A description of the attachment structure 32 is now provided with reference to FIGS. 6 and 8-12. The attachment structure 32 has a first part 62 and a second part 64. The first part 62 is a plate that has a trapezoidal shape that is dimensioned and shaped to correspond to the overall shape of the recessed area 60. The first part 62 has a peripheral edge dimensioned and shaped to correspond to the edge portion such that with the first part 62 inserted into the recessed area 60, movement of the rearward wall structure 42 relative to the first part 62 of the attachment structure 32 is restricted and/or prevented.

More specifically, when the tray body 30 is installed to the center console 12, the first part 62 fits snugly into the recessed area 60 retaining the tray body 30 in position relative to the center console 12.

The second part 64 of the attachment structure 32 includes at least one horizontal strap portion 66 and preferably two horizontal strap portions 66. The horizontal strap portions 66 are joined to opposite lateral sides of the first part 62 by a frangible part 68 such that the horizontal strap portion 66 are easily removed from the first part 64.

The first part 62 has three openings 62a, each opening 62a receiving a corresponding one of a plurality of snap-fitting projections 70. The front area 58 of the center console 12 includes or is subsequently provided with openings 72 such that the first part 62 of the attachment structure 32 is fixedly attached to the center console 12. The horizontal strap portions 66 are used to align and install the attachment structure 32 to the center console 12. Once installed to the center console 12, the horizontal strap portion 66 can be separated from the first part 62 by pulling on the horizontal strap portions 66 breaking the frangible parts 68. It should be understood that the frangible parts 68 are not required, but are optional features. The horizontal strap portions 66 can be made of plastic with a thickness that is thin enough to easily be broken off from the first part 62.

The center console accessory 11 (the tray body 30 and the attachment structure 32) can be a feature added on to the center console 12 as an aftermarket product or can be an original feature of the vehicle 20. The center console accessory 11 is easily installed and is also removable, if desired.

To install, the attachment structure 32 is first installed to the center console 12. The horizontal strap portions 66 are used to align the attachment structure 32 with predetermined features of the center console 12. The openings 72 in the center console 12 are marked using the first part 62 as a template and are then drilled out (unless they are already provided in the center console 12). Thereafter, the first part 62 is installed to the center console 12 using the snap-fitting projections 70 (shown in FIGS. 8-11 and 14). Once the first part 62 is installed, the horizontal strap portions 66 are removed (snapped off the first part 62).

Thereafter, the tray body 30 is placed into position such that the first part 62 of the attachment structure 32 is fitted into the recessed area 60. Further, the one of the hook material and loop material 54 installed to the underside surface 50a of the lower surface portion 50 (an inclined surface) contacts and connects to the other of the hook material and loop material 54 installed to the portion of the carpeting 24 overlaying the inclined area 26 of the floor 18. Thus, the attachment structure 32 fixed a rearward end of the tray body 30 to the center console 12 and the two parts of the hook material and loop material 54 fix a front end of the tray body 30 in position. It should be understood from the drawings and the description herein that the carpeting 24 can alternatively serve as the other of the hook material and loop material 54.

The various portions of the vehicle not described herein are conventional components that are well known in the art. Since these portions of the vehicle are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the center console assembly. Accordingly, these terms, as utilized to describe the present invention should be interpreted relative to a vehicle equipped with the center console assembly.

The term "configured" is used herein to describe a component, section or part of a structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A front console storage bin, comprising:
    a tray body having a floor, a pair of side wall structures, a forward wall structure and a rearward wall structure that together define a concaved storage area,
    the forward wall structure includes a lower surface portion shaped and dimensioned to connect to a vehicle floor structure of a vehicle and an upper surface portion that is inclined relative to horizontal and extends forward contacting an upwardly inclined portion of the vehicle floor structure, and
    the rearward wall structure is dimensioned and shaped to attach to a front area of a center console of the vehicle.

2. The front console storage bin, according to claim 1, wherein
    the rearward wall structure includes a recessed area and an attachment structure having a first part that fits into the recessed area and attaches to the center console of a passenger compartment of the vehicle.

3. The front console storage bin, according to claim 2, wherein
    the recessed area of the rearward wall structure is defined by an edge portion of the rearward wall, the edge portion having an inverted U-shape and the first part of the attachment structure has a peripheral edge dimensioned and shaped to correspond to the edge portion such that with the first part inserted into the recessed area movement of the rearward wall structure relative to the first part of the attachment structure is restricted.

4. The front console storage bin, according to claim 3, wherein
    the attachment structure further has a second part that includes at least one horizontal strap portion that is joined to the first part by a frangible part such that the at least one horizontal strap portion is removable from the first part.

5. The front console storage bin, according to claim 2, wherein
    the attachment structure further has a second part that includes a horizontal strap portion that is removable from the first part.

6. The front console storage bin, according to claim 2, wherein
    the lower surface portion of the forward wall structure is inclined relative to the floor of the tray body.

7. The front console storage bin, according to claim 6, wherein
the lower surface portion of the forward wall structure includes a one of a hook material and a loop material and the vehicle floor structure of the vehicle includes the other of the hook material and the loop material.

8. The front console storage bin, according to claim 1, wherein
the lower surface portion of the forward wall structure is inclined relative to the floor of the tray body.

9. The front console storage bin, according to claim 1, wherein
the rearward wall structure includes an inner wall portion, an outer wall portion and an upper surface portion that extends between upper ends of the inner and outer wall portions with a gap being defined between the inner and outer wall portions.

10. The front console storage bin, according to claim 1, wherein
each of the pair of side wall structures includes an inboard wall portion, and outboard wall portion and an upper wall portion that extends between upper ends of the inboard and outboard wall portions with a gap being defined between the inboard and outboard wall portions.

11. A front console storage bin, comprising:
a tray body having a floor, a pair of side wall structures, a forward wall structure and a rearward wall structure that together define a concaved storage area,
the forward wall structure includes a lower surface portion shaped and dimensioned to connect to a vehicle floor structure of a vehicle,
the rearward wall structure is dimensioned and shaped to attach to a front area of a center console of the vehicle, and
the lower surface portion of the forward wall structure includes a one of a hook material and a loop material and the vehicle floor structure of the vehicle includes the other of the hook material and the loop material.

12. The front console storage bin, according to claim 11, wherein
the forward wall structure includes the lower surface portion and an upper surface portion that is inclined relative to horizontal and extends forward contacting an upwardly inclined portion of the vehicle floor structure.

13. The front console storage bin, according to claim 11, wherein
the rearward wall structure includes a recessed area and an attachment structure that fits into the recessed area and attaches to the center console.

14. The front console storage bin, according to claim 13, wherein
the recessed area is defined by an edge portion of the rearward wall, with the attachment structure inserted into the recessed area so that movement of the rearward wall structure relative to the attachment structure and the center console is restricted.

15. The front console storage bin, according to claim 14, wherein
the edge portion has an inverted U-shape and the attachment structure has a peripheral edge dimensioned and shaped to correspond to the edge portion.

16. A front console storage bin, comprising:
a tray body having a floor, a pair of side wall structures, a forward wall structure and a rearward wall structure that together define a concaved storage area,
the forward wall structure includes a lower surface portion shaped and dimensioned to connect to a vehicle floor structure of a vehicle,
the rearward wall structure is dimensioned and shaped to attach to a front area of a center console of the vehicle,
the rearward wall structure includes an inner wall portion, an outer wall portion and an upper surface portion that extends between upper ends of the inner and outer wall portions with a gap being defined between the inner and outer wall portions, and
the outer wall portion of the rearward wall structure includes a recessed area that is open to the gap.

17. The front console storage bin, according to claim 16, wherein
the outer wall portion of the rearward wall structure also includes an attachment structure having a first part that fits into the recessed area and a second part that attaches to the center console of a passenger compartment of the vehicle.

18. The front console storage bin, according to claim 17, wherein
the recessed area of the rearward wall structure is defined by an edge portion of outer wall portion of the rearward wall, the edge portion having an inverted U-shape and the first part of the attachment structure has a peripheral edge dimensioned and shaped to correspond to the edge portion of the outer wall portion of the rearward wall such that with the first part inserted into the recessed area movement of the rearward wall structure relative to the first part of the attachment structure and the center console of the passenger compartment of the vehicle is restricted.

19. The front console storage bin, according to claim 18, wherein
the first part of the attachment structure includes at least one snap-fitting projection that connects the first part to the center console of a passenger compartment of the vehicle.

20. The front console storage bin, according to claim 16, wherein
the lower surface portion of the forward wall structure includes a one of a hook material and a loop material and the vehicle floor structure of the vehicle includes the other of the hook material and the loop material.

* * * * *